United States Patent [19]
Bodart et al.

[11] Patent Number: 5,267,821
[45] Date of Patent: Dec. 7, 1993

[54] BINDERY LINE BOOK ACCUMULATOR

[75] Inventors: Joseph C. Bodart, Norwalk; David J. Bruns, Tiffin; Carolyn S. Lambert, Monroeville, all of Ohio

[73] Assignee: R. R. Donnelley & Sons Co., Chicago, Ill.

[21] Appl. No.: 843,559

[22] Filed: Feb. 28, 1992

[51] Int. Cl.$^5$ .................. B42C 1/12; B65G 47/00; B65H 39/02
[52] U.S. Cl. .................. 412/11; 412/14; 198/347.4; 198/433; 198/447; 270/54
[58] Field of Search .......... 412/11, 12, 13, 14, 412/5, 21; 198/347.1, 347.4, 429, 430, 433, 447; 29/709; 270/54

[56] References Cited

U.S. PATENT DOCUMENTS

| | | | |
|---|---|---|---|
| 3,118,549 | 1/1964 | Hoellen | 198/347.4 |
| 3,122,231 | 2/1964 | Pence et al. | 198/347.4 |
| 3,153,487 | 10/1964 | Hoellen | 198/347.4 |
| 3,734,267 | 5/1973 | Tice | 198/347.1 |
| 3,998,319 | 12/1976 | Mernoe | 198/347.1 |
| 4,569,620 | 2/1986 | Lynch | 412/21 |
| 4,570,783 | 2/1986 | Newcom et al. | 198/347.1 |
| 4,635,784 | 1/1987 | Bourgeois | 198/429 X |
| 4,650,371 | 3/1972 | Constable et al. | 405/211 |
| 5,098,076 | 3/1992 | Kelsey | 198/347.1 X |
| 5,112,179 | 5/1992 | Chan et al. | 412/11 X |

Primary Examiner—Mark Rosenbaum
Assistant Examiner—S. Thomas Hughes
Attorney, Agent, or Firm—Wood, Phillips, Van Santen, Hoffman & Ertel

[57] ABSTRACT

In order to improve binding line output by reducing equipment downtime effects, a book accumulator for a binding line is provided. The binding line book accumulator includes a book accumulating table for accumulating books from and returning books to a binding line in first-in first-out fashion, and it also includes a first diverter for diverting books from the binding line to the book accumulating table and a second diverter for diverting books from the book accumulating table to the binding line. In addition, a control is provided for selectively and independently operating the first and second diverters upon demand in response to a variety of factors.

13 Claims, 2 Drawing Sheets

BINDERY LINE BOOK ACCUMULATOR

FIELD OF THE INVENTION

The present invention is generally related to improved efficiency in binding lines and, more particularly, a book accumulator for a binding line for casebound books or the like.

BACKGROUND OF THE INVENTION

In a binding line, there is typically an upstream gathering and binding section and a downstream backing and casing-in section that includes a variety of equipment. The gathering section, particularly for casebound books, will normally comprise a plurality of stations or locations where signatures are gathered in seriatim fashion on a main production line to make up the pages of the book upstream of the casing-in section. With this arrangement, the books then travel along the main production line to the casing-in section where they are bound, trimmed and prepared for shipment.

In many cases, the gathering section can be operated entirely independently of the casing-in section. Thus, if some equipment associated with the casing-in section should fail for any reason, it is at least theoretically possible to continue operating the gathering section to make up books which need only later be backed, cased-in and prepared for shipment. Unfortunately, it has not been possible to provide the degree of automation that would be desirable in such instances.

In other words, there has been no practical system for automatically diverting book blocks from a gathering section when downstream equipment has failed. Likewise, there has been no practical system for automatically refeeding book blocks from a gathering section once downstream equipment has been repaired. Additionally, there has been no practical system for automatically refeeding book blocks into empty spaces on a main production line in a first-in first-out fashion.

As is known, it is also possible for upstream equipment in a binding line to experience failure. Thus, it would be desirable to be able to have book blocks from the gathering section of a binding line available in the event of such a failure to continue running downstream equipment where such book blocks still must be trimmed, bound and prepared for shipment. Once again, there has been no means for automatically accumulating a supply of book blocks for this purpose.

The present invention is directed to overcoming one or more of the foregoing problems and achieving one or more of the resulting objects.

SUMMARY OF THE INVENTION

It is therefore a principal object of the present invention to provide a book accumulator for a binding line for book blocks or the like. It is a further object of the present invention to provide a book accumulator wherein book blocks are automatically diverted into the book accumulator when downstream equipment fails and then are automatically returned to the binding line when empty spaces are detected. It is additionally an object of the present invention to provide a book accumulator that receives and delivers books in a first-in first-out manner.

Accordingly, the present invention is directed to a binding line book accumulator having means for accumulating books from and returning books to a binding line in first-in first-out fashion. It also includes first means for diverting books from the binding line to the accumulating means and second means for diverting books from the accumulating means to the binding line. Additionally, the present invention is directed to a binding line book accumulator wherein the second book diverting means is operable at a point downstream of the first book diverting means.

In the exemplary embodiment, the accumulating means includes a book accumulating table disposed between the first and second book diverting means and a book pusher for placing books on and removing books from the book accumulating table. Advantageously, the first book diverting means comprises a first book diverter adjacent the binding line at a first position therealong and the second book diverting means includes a second book diverter adjacent the binding line at a second position therealong. Preferably, a book accumulator infeed line extends from the first book diverter to the book accumulating table and a book accumulator outfeed line extends from the book accumulating table to the second book diverter.

With this arrangement, the binding line book accumulator also preferably includes control means for selectively and independently operating the first and second book diverters for diverting books from the binding line to the book accumulating table upon demand and diverting books from the book accumulating table to the binding line upon demand.

In a highly preferred embodiment, the present invention is directed to a book accumulator for a binding line for casebound books wherein the control means is also operatively associated with the book pusher and the binding line.

In one respect, the control means may advantageously include sensing means operatively associated with the binding line at a point or points downstream of the second position with the sensing means being responsive to a downstream equipment failure to cause the control means to operate the first book diverter. The sensing means may then also cause the control means to operate the book accumulator infeed line and the book pusher to place books on the book accumulating table in a preselected manner for later removal from the book accumulating table for returning casebound books to the binding line in first-in first-out fashion.

In another respect, the control means may advantageously include sensing means operatively associated with the binding line at a point or points upstream of the first position with the sensing means being responsive to an upstream equipment failure to cause the control means to operate the second book diverter. The sensing means may then also cause the control means to operate the book accumulator outfeed line and the book pusher to remove books from the book accumulating table in a preselected manner based upon earlier placement on the book accumulating table for returning books to the binding line in first-in first-out fashion.

In yet another respect, the control means may advantageously include sensing means operatively associated with the binding line at a point or points upstream of the second position with the sensing means being responsive to an empty space on the binding line to cause the control means to operate the second book diverter. The sensing means may then also cause the control means to operate the book accumulator outfeed line and the book pusher to remove books from the book accumulating table in a preselected manner based on earlier placement on the book accumulating table for returning books to the binding line in first-in first-out fashion.

In a most highly preferred embodiment, the control means will include sensing means operatively associated with the binding line at various points upstream of the first position, upstream of the second position, and downstream of the second position.

Other objects, advantages and features of the present invention will become apparent from a consideration of the following specification taken in conjunction with the accompanying drawings.

DETAILED DESCRIPTION OF THE PREFERRED EMBODIMENT

Figure 1:
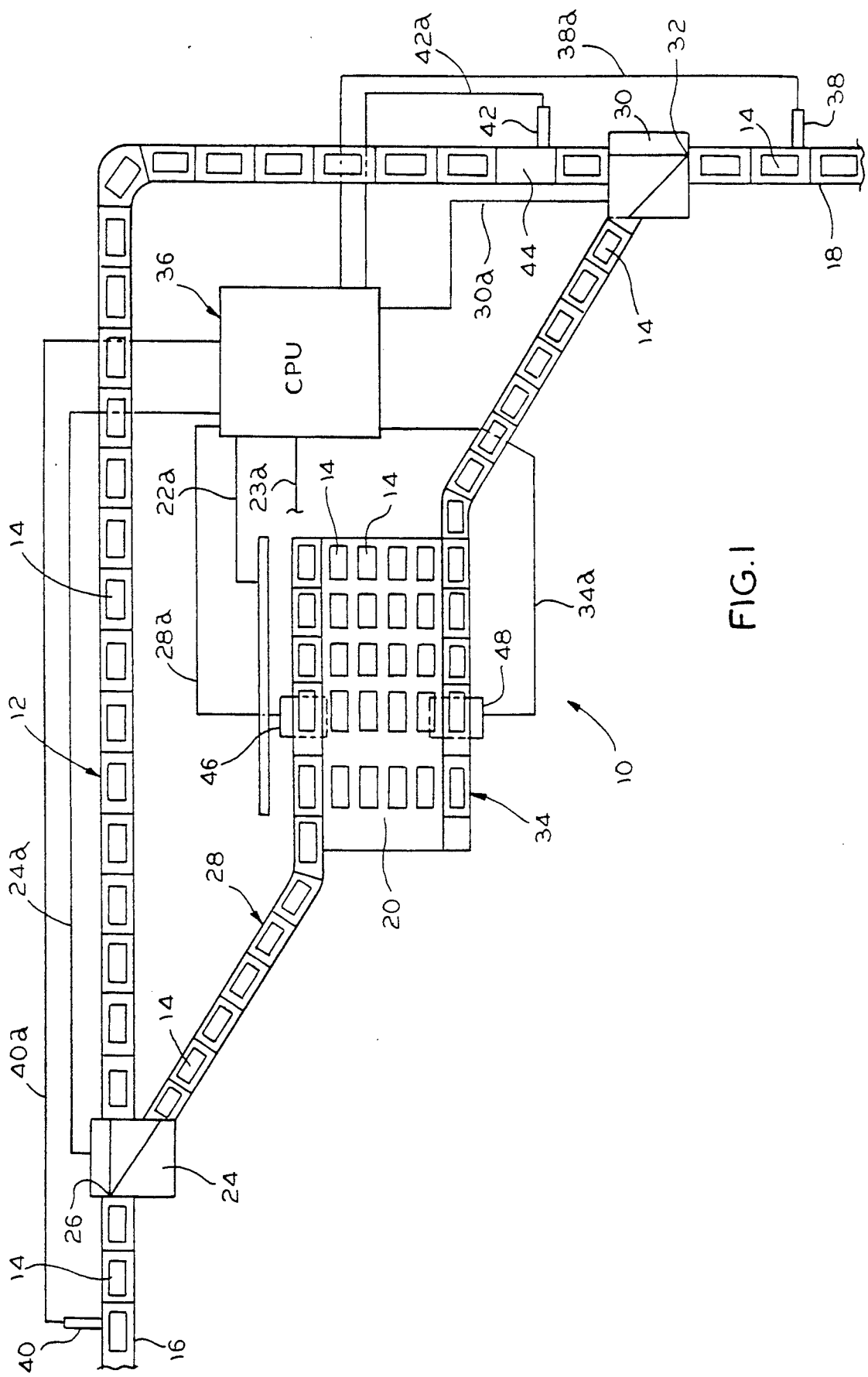
FIG. 1 is a schematic plan view of a book accumulator for a binding line illustrating the present invention.

In the illustrations given, and with reference first to FIG. 1, the reference numeral 10 designates generally a book accumulator for a binding line 12. It will be noted in the description hereinafter that the binding line 12 is described in connection with the binding of casebound books which are finished from book blocks 14 which is for purposes of illustration and not limitation. As will be appreciated, the binding line 12 generally will include an upstream gathering and binding section 16 and a downstream backing and casing-in section 18.

Still referring to FIG. 1, the book accumulator 10 includes means for accumulating book blocks 14 from and returning book blocks 14 to the binding line 12 in first-in first-out fashion. The accumulating means includes a book accumulating table 20 operatively positioned between the upstream and downstream sections 16 and 18. Additionally, the accumulating means includes a first or overhead "rack" book pusher 22 (see also FIGS. 2 and 3) for placing book blocks 14 on and a second or underneath "rake" book pusher 23 for removing book blocks 14 from the book accumulating table 20.

Referring once again to FIG. 1, the book accumulator 10 includes first means for diverting book blocks 14 from the binding line 12 to the book accumulating table 20 in the form of a first book block diverter 24 adjacent the binding line 12 at a first position 26. A book accumulator infeed line 28 extends from the first book block diverter 24 to the book accumulating table 20 to carry book blocks 14 diverted from the binding line 12 to the book accumulating table 20. The book accumulator 10 also includes second means for diverting book blocks 14 from the book accumulating table 20 to the binding line 12 including a second book block diverter 30 adjacent the binding line 12 at a second position 32. A book accumulator outfeed line 34 extends from the book accumulating table 20 to the second book block diverter 30 to carry book blocks 14 from the book accumulating table 20 to be diverted to the binding line 12.

As will also be seen, the book accumulator 10 includes control means generally designated 36 for selectively and independently operating the first and second book block diverters 24 and 30. The control means 36 operates such that book blocks 14 can be diverted from the binding line 12 to the book accumulating table 20 from the upstream section 16 upon demand and can be diverted from the book accumulating table 20 to the downstream section 18 of the binding line 12 upon demand. With this arrangement, the control means 36 is also operatively associated with the binding line 12 and both book pushers 22 and 23 in a manner that will be described in greater detail hereinafter.

As shown in FIG. 1, the control means 36 includes sensing means 38 operatively associated with the binding line 12 downstream of the second position 32 so as to be responsive to a downstream equipment failure, i.e., an equipment failure in the downstream section 18 of the binding line 12. The sensing means 38 signals the control means 36 to operate the first book block diverter 24 for diverting book blocks 14 from the binding line 12 to the book accumulating table 20 in the event of such an equipment failure, and it also causes the control means 36 to operate the book accumulator infeed line 28 and the first book pusher 22. As a result, book blocks 14 can be placed on the book accumulating table 20 in a preselected manner for later removal from the book accumulating table 00 for returning book blocks 14 to the binding line 12 in first-in first-out fashion.

As also shown in FIG. 1, the control means 36 includes sensing means 40 operatively associated with the binding line 12 upstream of the first position 26 so as to be responsive to an upstream equipment failure, i.e., an equipment failure in the upstream section 16 of the binding line 12. The sensing means 40 signals the control means 36 to operate the second book block diverter for diverting book blocks 14 from the book accumulating table 20 to the binding line 12 in the event of such an equipment failure, and it also causes the control means 36 to operate the book accumulator outfeed line 34 and the second book pusher 23. As a result, book blocks 14 can be removed from the book accumulating table 20 in a preselected manner based upon earlier placement on the book accumulating table 20 for returning book blocks 14 to the binding line 12 in first-in first-out fashion.

Further, as shown in FIG. 1, the control means 36 includes sensing means 42 associated with the binding line 12 upstream of the second position 32 so as to be responsive to an empty space such as 44 on the binding line 12, i.e., a space along the binding line 12 without a book block 14. The sensing means 42 signals the control means 36 to operate the second book block diverter 30 to divert a book block 14 from the book accumulating table 20 to fill the empty space such as 44, and it does this by causing the control means 36 to operate the book accumulator outfeed line 34 and the second book pusher 23 to advance accumulated books toward the binding line 12. As a result, book blocks 14 can be removed from the book accumulating table 20 in a preselected manner based upon earlier placement on the book accumulating table 20 for returning book blocks 14 to the binding line 12 in first-in first-out fashion.

From the foregoing, it will be understood that both book pushers 22 and 23 and book accumulator outfeed line 34 operate in a manner so as to always have a book block 14 in position adjacent the second book block diverter 30 to be advanced back onto the binding line 12 to fill any empty spaces such as 44.

As will be appreciated, the second book block diverter 30 is operatively associated with the binding line 12 at a point downstream of the first book block diverter 24 in the illustrated embodiment. In fact, the book accumulator 10 spans the upstream or gathering and binding section 16 and downstream or backing and casing-in section 18 of the binding line 12, which may typically be independently operable sections, thereby making it possible to operate either section independent of the other to either accumulate books on the book accumulating table 20 when the downstream section 18 is shut down or to feed books from the book accumulating table 20 when the upstream section is shut down. In addition, even when both sections are operating, the book accumulating table 20 can feed previously accumulated books to fill empty spaces such as 44 on the binding line 12 as the books move to the downstream or backing and casing-in section 18.

While shown schematically, the control means 36 will typically take the form of a central processing unit which is operatively associated with the various sensors 38, 40 and 42 by appropriate signal transmitting lines 38a, 40a, and 42a. The central processing unit 36 is also operatively associated with the diverters 24 and 30 by appropriate signal transmitting lines 24a and 30a, with the book pushers 22 and 23 by appropriate signal transmitting lines 22a and 23a, and with the book accumulator infeed and outfeed lines 28 and 34 by appropriate signal transmitting lines 28a and 34a. In the last-mentioned case, i.e., the case of the book accumulator infeed and outfeed lines 28 and 34, the signal transmitting lines 28a and 34a may control operation of suitable drive motors 46 and 48.

Figure 2:
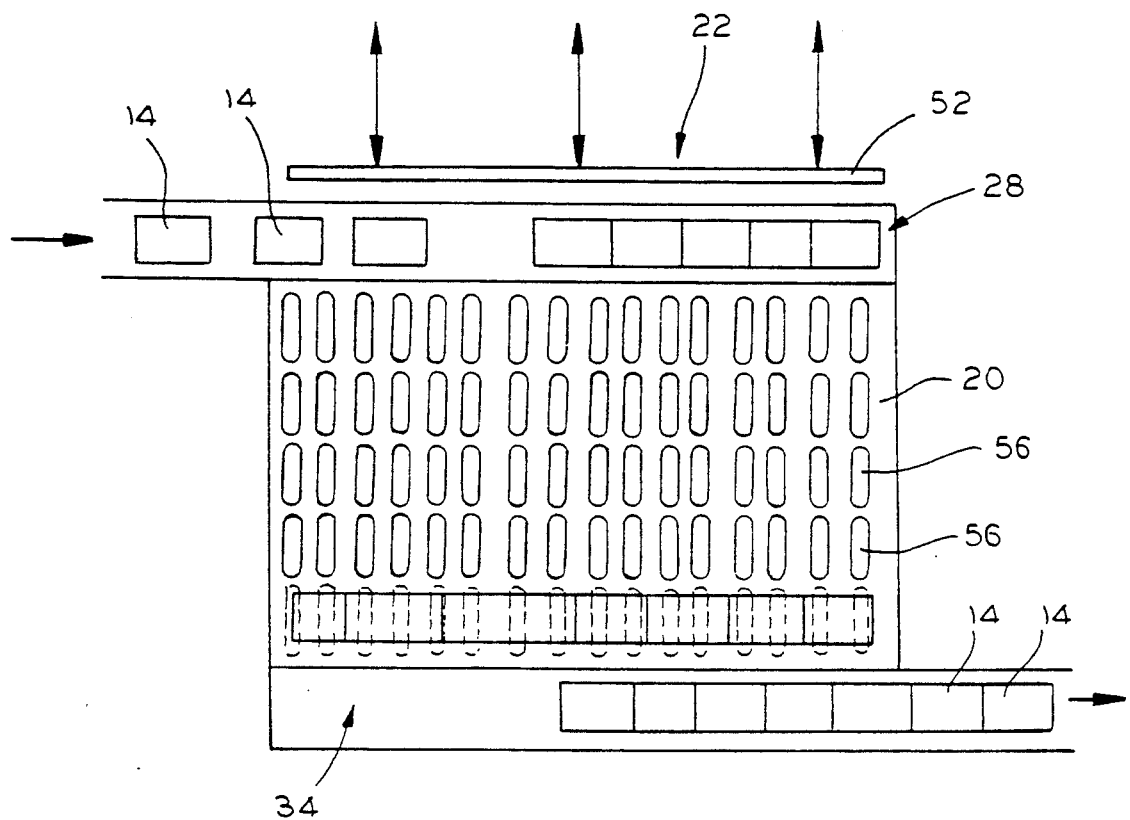
FIG. 2 is a schematic top plan view of a portion of the book accumulator illustrated in FIG. 1.
Figure 3:
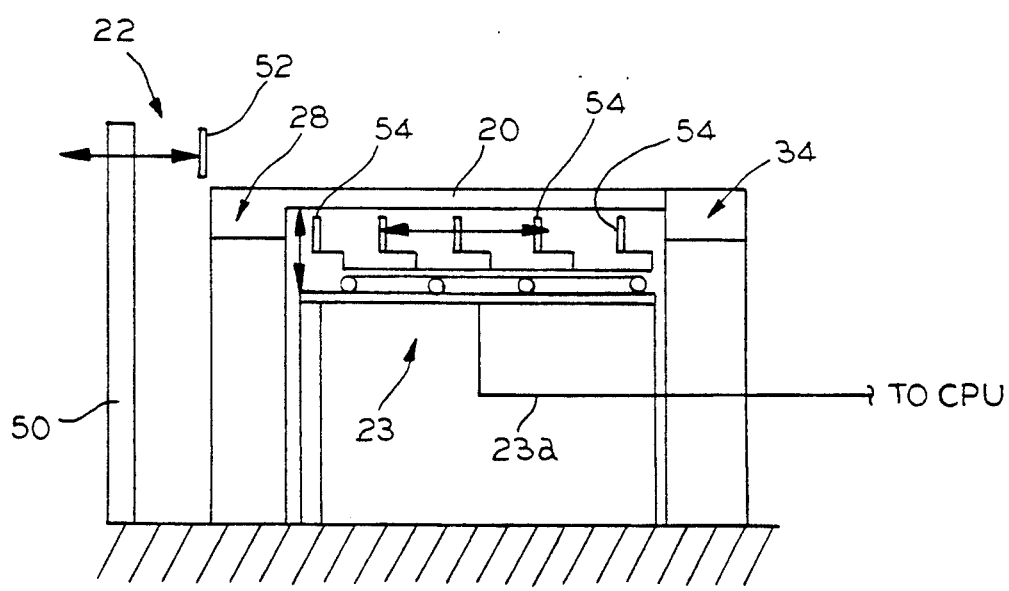
FIG. 3 is a schematic elevational view of the portion of the book accumulator illustrated in FIG. 2.

Referring to FIGS. 2 and 3, the overhead book pusher 22 has been schematically illustrated as being mounted on a supporting rack 50. It is also schematically shown that the overhead book pusher 22 includes what can take the form of a hydraulically activated pusher plate 52 that may on demand remove books moving in a continuous stream along the book accumulator infeed line 28 from the infeed line 28 to the book accumulating table 20 The row of books so removed will then comprise the row of books on the book accumulating table 20 nearest the book accumulator infeed line 28. It is further schematically shown that the underneath book pusher 23 includes what can take the form of a rake consisting of a plurality of fingers 54 that may on demand be made to project through slots 56 in the book accumulating table 20 and move toward the book accumulator outfeed line 34. The rows of books on the book accumulating table 20 are then each advanced by the rake toward the book accumulator outfeed line 34. In addition, the movement of the fingers 54 in the slots 56 causes the row of books nearest the book accumulator outfeed line 34 to be delivered to that line.

In this connection, the operation of the various components of this system is responsive to signals from the central processing unit 36 which makes it possible to accumulate and discharge books from the book accumulating table 20 in a preselected manner so as to accomplish first-in first-out book accumulation thereby as will now be readily apparent to those skilled in the art.

With the present invention, the book accumulating table 20 essentially provides a buffer between upstream and downstream components which provides another important advantage in that the system disclosed herein is able to accommodate non-synchronous operation between the upstream and downstream components by negating the effects of differences in speed therebetween.

While many details of construction of the binding line 12 have been omitted for simplicity sake, they will all be readily apparent to those skilled in the art. It will likewise be apparent that there are various different forms which the diverters, infeed and outfeed lines, book accumulating table, and sensors can take and that they can be interconnected in a wide variety of fashions to a central processing unit or other control means. Still other variations on the details of the invention will be apparent to those skilled in the art depending upon the requirements of a particular application.

While in the foregoing there has been set forth a preferred embodiment of the invention for purposes of illustration, it will be appreciated that the details herein given may be varied by those skilled in the art without departing from the true spirit and scope of the appended claims.

We claim:

1. In a binding line having an upstream binding line section and a downstream binding line section wherein said upstream and downstream binding line sections are independently operable upon demand, the improvement comprising:

means for accumulating books from said upstream binding line section and returning books to said downstream binding line section in first in - first out fashion;

first means for diverting books from said upstream binding line section to said accumulating means upon demand;

second means for diverting books from said accumulating means to said downstream binding line section upon demand;

said second book diverting means being operable at a point downstream of said first book diverting means; and control means for selectively operating either or both of said first and second book diverting mans independently of each other upon demand, said control means being operable to selectively cause said first book diverting means to divert books from said upstream binding line section to said book accumulating means upon demand, said control means also selectively causing said second book diverting means to divert books from said book accumulating means to said downstream binding line section upon demand;

said book accumulating means including a book accumulating table for accumulating books in a plurality of rows thereon, and further including a book accumulator infeed line leading from said upstream binding line section to said book accumulating table and a book accumulator outfeed line leading from said book accumulating table to said downstream binding line section.

2. The binding line book accumulator of claim 1 wherein said accumulating means includes a book pusher for placing books on and a book pusher for removing books from said book accumulating table.

3. The binding line book accumulator of claim 1 wherein said first book diverting means includes a first book diverter adjacent said upstream binding line section.

4. The binding line book accumulator of claim 1 wherein said second book diverting means includes a second book diverter adjacent said downstream binding line section.

5. In a book accumulator for a binding line for casebound books having an upstream gathering and binding section and a downstream backing and casing - in section wherein said upstream and downstream sections are independently operable upon demand, the improvement comprising:

means for accumulating book blocks from said upstream section and returning book blocks to said downstream section in first in - first out fashion, said accumulating means including a book accumulating table operatively positioned between said first and second book diverting means for accumulating book blocks in a plurality of rows thereon;

first means for diverting book blocks from said upstream section to said book accumulating table including a first book block diverter adjacent said upstream section;

second means for diverting book blocks from said book accumulating table to said downstream section including a second book block diverter adjacent said downstream section; and control means for selectively operating either or both of said first and second book block diverting means independently of each other for diverting book blocks from said upstream section to said book accumulating table upon demand and diverting book blocks from said book accumulating table to said downstream section upon demand;

said book accumulating means further including a book accumulator infeed line leading from said upstream section to said book accumulating table and a book accumulator outfeed line leading from said book accumulating table to said downstream section.

6. The binding line book accumulator of claim 5 wherein said accumulating means includes a book pusher for placing books on and a book pusher for removing books from said book accumulating table.

7. A book accumulator for a binding line for casebound books, comprising:

means for accumulating book blocks from and returning book blocks to said binding line in first in - first out fashion, said accumulating means including a book accumulating table operatively positioned between said first and second book diverting means, said accumulating means also including an overhead book pusher for placing book blocks on and an underneath book pusher for removing book blocks from said book accumulating table;

first means for diverting book blocks from said binding line to said book accumulating table including a first book block diverter adjacent said binding line at a first position, and a book accumulator infeed line extending from said first book block diverter to said book accumulating table to carry book blocks diverted from said binding line to said book accumulating table;

second means for diverting book blocks from said book accumulating table to said binding line including a second book block diverter adjacent said binding line at a second position, and a book accumulator outfeed line extending from said book accumulating table to said second book block diverter to carry book blocks from said book accumulating table to be inverted to said binding line; and control means for selectively and independently operating said first and second book block diverters for diverting book blocks from said binding line to said book accumulating table upon demand and diverting book blocks from said book accumulating table to said binding line upon demand;

said control means for operating said diverting means also being operatively associated with said overhead and underneath book pushers and said binding line, said second book block diverter being operatively associated with said binding line at a point downstream of said first book block diverter.

8. The binding line book accumulator of claim 7 wherein said control means includes sensing means operatively associated with said binding line downstream of said second position, said sensing means being responsive to a downstream equipment failure to cause said control means to operate said first book block diverter for diverting book blocks from said binding line to said book accumulating table.

9. The binding line book accumulator of claim 8 wherein said sensing means also causes said control means to operate said book accumulator infeed line and said overhead book pusher to place book blocks on said book accumulating table in a preselected manner for later removal from said book accumulating table for returning book blocks to said binding line in first in - first out fashion.

10. The binding line book accumulator of claim 7 wherein said control means includes sensing means operatively associated with said binding line upstream of said first position, said sensing means being responsive to an upstream equipment failure to cause said control means to operate said second book block diverter for diverting book blocks from said book accumulating table to said binding line.

11. The binding line book accumulator of claim 10 wherein said sensing means also causes said control means to operate said book accumulator outfeed line and said underneath book pusher to remove book block from said book accumulating table in a preselected manner based upon earlier placement on said book accumulating table for returning book blocks to said binding line in first in - first out fashion.

12. The binding line book accumulator of claim 7 wherein said control means includes sensing means operatively associated with said binding line upstream of said second position, said sensing means being responsive to an empty space on said binding line to cause said control means to operate said second book block diverter for diverting book blocks from said book accumulating table to fill said empty space.

13. The binding line book accumulator of claim 12 wherein said sensing means also causes said control means to operate said book accumulator outfeed line and said underneath book pusher to remove book blocks from said book accumulating table in a preselected manner based upon earlier placement on said book accumulating table for returning book blocks to said binding line in first in - first out fashion.

* * * * *